United States Patent
Lee et al.

(10) Patent No.: US 10,637,553 B2
(45) Date of Patent: Apr. 28, 2020

(54) METHOD FOR TRANSMITTING FEEDBACK INFORMATION IN WIRELESS COMMUNICATION SYSTEM AND DEVICE THEREFOR

(71) Applicant: LG ELECTRONICS INC., Seoul (KR)

(72) Inventors: Sangrim Lee, Seoul (KR); Hojae Lee, Seoul (KR); Hyunsoo Ko, Seoul (KR); Kwangseok Noh, Seoul (KR); Dongkyu Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/765,883

(22) PCT Filed: Jan. 21, 2016

(86) PCT No.: PCT/KR2016/000642
§ 371 (c)(1),
(2) Date: Apr. 4, 2018

(87) PCT Pub. No.: WO2017/061670
PCT Pub. Date: Apr. 13, 2017

(65) Prior Publication Data
US 2018/0287685 A1 Oct. 4, 2018

Related U.S. Application Data

(60) Provisional application No. 62/236,980, filed on Oct. 5, 2015.

(51) Int. Cl.
*H04B 7/02* (2018.01)
*H04B 7/06* (2006.01)
(Continued)

(52) U.S. Cl.
CPC ......... *H04B 7/0632* (2013.01); *H04B 7/0456* (2013.01); *H04B 7/0639* (2013.01);
(Continued)

(58) Field of Classification Search
CPC .. H04B 7/0632; H04B 7/0456; H04B 7/0639; H04L 1/00; H04L 27/26; H04L 27/2607; H04L 27/264; H04W 52/241
(Continued)

(56) References Cited

U.S. PATENT DOCUMENTS

2016/0080961 A1\* 3/2016 Kim ................... H04L 27/264
370/252
2016/0095131 A1 3/2016 Seo et al.
(Continued)

FOREIGN PATENT DOCUMENTS

EP 1 775 857 A1 4/2007
EP 2 843 892 A1 3/2015
(Continued)

*Primary Examiner* — Zewdu A Kassa
(74) *Attorney, Agent, or Firm* — Birch, Stewart, Kolasch & Birch, LLP

(57) ABSTRACT

A method by which a terminal transmits feedback information in a wireless communication system can comprise the steps of: selecting a filter index for maximizing a signal to interference-plus-noise (SINR) or a signal to leakage-and-noise ratio (SLNR) in a filter book defined in advance for each resource block (RB) or subband; and transmitting, to a base station, feedback information including the selected filter index for each RB or subband.

10 Claims, 7 Drawing Sheets

(51) Int. Cl.
  *H04L 27/26*   (2006.01)
  *H04L 1/00*   (2006.01)
  *H04B 7/0456*   (2017.01)
  *H04W 52/24*   (2009.01)

(52) U.S. Cl.
  CPC .............. *H04L 1/00* (2013.01); *H04L 27/26* (2013.01); *H04L 27/264* (2013.01); *H04L 27/2607* (2013.01); *H04W 52/241* (2013.01)

(58) Field of Classification Search
  USPC ............. 375/267, 260, 259, 316, 295, 219
  See application file for complete search history.

(56) References Cited

U.S. PATENT DOCUMENTS

2016/0192353 A1*  6/2016  Abdoli ................. H04L 27/264
                      370/336
2018/0139080 A1*  5/2018  Kim ..................... H04L 1/0643

FOREIGN PATENT DOCUMENTS

| KR | 10-2007-0042099 A | 4/2007 |
|----|----|----|
| KR | 10-2008-0043467 A | 5/2008 |
| KR | 10-2012-0060124 A | 6/2012 |
| KR | 10-1541813 B1 | 8/2015 |
| WO | WO 2014/189338 A1 | 11/2014 |

* cited by examiner

FIG. 7

Filter book

| | Filter coefficient |
|---|---|
| 1 | f 1 |
| 2 | f 2 |
| 3 | f 3 |
| ⋮ | ⋮ |
| N | fN |

METHOD FOR TRANSMITTING FEEDBACK INFORMATION IN WIRELESS COMMUNICATION SYSTEM AND DEVICE THEREFOR

CROSS REFERENCE TO RELATED APPLICATIONS

This application is the National Phase of PCT International Application No. PCT/KR2016/000642, filed on Jan. 21, 2016, which claims priority under 35 U.S.C. 119(e) to U.S. Provisional Application No. 62/236,980, filed on Oct. 5, 2015, all of which are hereby expressly incorporated by reference into the present application.

TECHNICAL FIELD

The present invention relates to wireless communication, and more particularly, to a method of transmitting feedback information in a wireless communication system and apparatus therefor.

BACKGROUND ART

The existing OFDM (orthogonal frequency division multiplexing) scheme strongly requires restriction put on time-frequency synchronization. Yet, New Waveform that is one of core technologies of the 5G communication is being developed to supplement weak points of the existing OFDM scheme and accommodate more various services by moderating such restrictions.

The new waveform technique considered as the core technique of the next generation 5G system innovatively lowers OOBE (out-of-bound emission) in comparison with OFDM, whereby utilization of a fragmented spectrum in a frequency exhausted state and a performance gain for time asynchronization can be expected.

DISCLOSURE OF THE INVENTION

Technical Tasks

One technical task achieved by the present invention is to provide a method for a user equipment to transmit feedback information in a wireless communication system.

Another technical task achieved by the present invention is to provide a user equipment for transmitting feedback information in a wireless communication system.

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

In one technical aspect of the present invention, provided herein is a method for transmitting feedback information by a user equipment in a wireless communication system, including selecting a filter index for maximizing a SINR (signal to interference-plus-noise ratio) or SLNR (signal to leakage-and-noise ratio) from a predefined filter book per RB (resource block) or subband and transmitting the feedback information including the filter index selected per the RB or the subband to a base station.

The feedback information may further include filter quality information corresponding to the selected filter index. The wireless communication system may include a Filtered Cyclic Prefix-Orthogonal Frequency Division Multiplexing (FCP-OFDM) system. The selected filter index may correspond to a filter enabling the SINR or the SLNR to become a maximum for a downlink signal to which a Filtered Cyclic Prefix-Orthogonal Frequency Division Multiplexing (FCP-OFDM) scheme is applied. The RB or the subband may include all RBs allocated to the user equipment. The RB or the subband may include a specific RB or a specific subband instructed to report feedback by the base station among RBs or subbands allocated to the user equipment.

In another technical aspect of the present invention, provided herein is a user equipment for transmitting feedback information in a wireless communication system, including a processor configured to select a filter index for maximizing a SINR (signal to interference-plus-noise ratio) or SLNR (signal to leakage-and-noise ratio) from a predefined filter book per RB (resource block) or subband and a transmitter configured to transmit the feedback information including the filter index selected per the RB or the subband to a base station. The feedback information may further include filter quality information corresponding to the selected filter index. The wireless communication system may include a Filtered Cyclic Prefix-Orthogonal Frequency Division Multiplexing (FCP-OFDM) system. The selected filter index may correspond to a filter enabling the SINR or the SLNR to become a maximum for a downlink signal to which a Filtered Cyclic Prefix-Orthogonal Frequency Division Multiplexing (FCP-OFDM) scheme is applied. The RB or the subband may include all RBs allocated to the user equipment. The RB or the subband may include a specific RB or a specific subband instructed to report feedback by the base station among RBs or subbands allocated to the user equipment.

Advantageous Effects

In a wireless communication system based on Filtered CP-OFDM that is a new waveform, a base station can optimize system performance or user equipment performance through adaptive application of a filter based on filter relevant feedback information coming from user equipments.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 7 is a diagram showing one example of a filter book defined in advance.

BEST MODE FOR INVENTION

Figure 1:
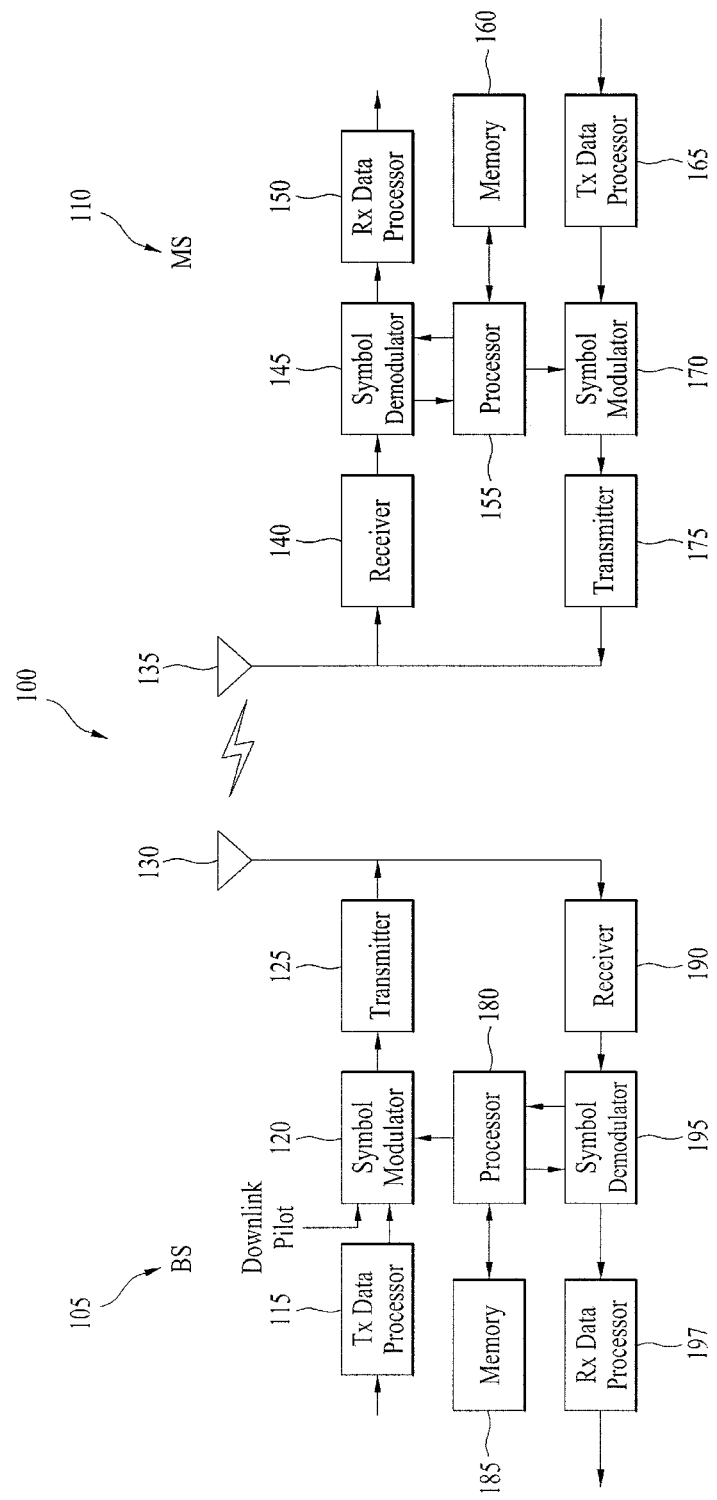
FIG. 1 is a block diagram showing configurations of a base station 105 and a user equipment 110 in a wireless communication system 100.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like. Although the present specification is described based on IEEE 802.16m system, contents of the present invention may be applicable to various kinds of other communication systems.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

The following descriptions are usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented by such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE employs OFDMA in DL and SC-FDMA in UL. And, LTE-A (LTE-Advanced) is an evolved version of 3GPP LTE.

Moreover, in the following description, specific terminologies are provided to help the understanding of the present invention. And, the use of the specific terminology can be modified into another form within the scope of the technical idea of the present invention.

FIG. 1 is a block diagram for configurations of a base station 105 and a user equipment 110 in a wireless communication system 100.

Although one base station 105 and one user equipment 110 (D2D user equipment included) are shown in the drawing to schematically represent a wireless communication system 100, the wireless communication system 100 may include at least one base station and/or at least one user equipment.

Referring to FIG. 1, a base station 105 may include a transmission (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmission (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present invention supports an MIMO (multiple input multiple output) system. And, the base station 105 according to the present invention may support both SU-MIMO (single user-MIMO) and MU-MIMO (multi user-MIMO) systems.

In downlink, the transmission data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples.

The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmission data processor 115 in the base station 105, respectively.

In the user equipment 110 in uplink, the transmission data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present invention as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

As techniques of new waveform series of a next generation 5G system, there are filter back multicarrier (FBMC) of allowing inter-symbol overlapping, universal filtered-OFDM (UF-OFDM) of applying a filter newly by removing CP from OFDM, filtered CP-OFDM (FCP-OFDM) of flexibly applying a filter by maintaining CP in OFDM, etc. The corresponding techniques mainly differ from each other in transmission/reception schemes and have performance trade-off in various aspects such as OOBE, complexity, Time-frequency resource efficiency, robustness for multi-channel delay, time asynchronization, frequency asynchronization, etc.

In case of FBMC, a transmitter of a poly phase network (PPN) type due to a scheme of allowing inter-symbol overlapping, which requires high complexity. Moreover, since Offset QAM is used, it is very difficult to apply the existing MIMO transceiving schemes. Yet, as a pulse shape is applied by subcarrier unit, OOBE has performance better than that of other UG-OFDM or FCP-OFDM. In case of UF-OFDM, an existing CP is removed and a filter amounting to the removed CP is applied by subband unit (e.g., 12 subcarriers) so as to lower OOBE. This has OOBE performance not better than that of FBMC but is advantageous in directly applying the existing schemes (i.e., MIMO scheme) applied to OFDM. Yet, as 2N-FFT is performed by a receiving end due to the absence of CP instead of N-point FFT, high complexity is caused.

Finally, according to FCP-OFDM, a CP length is reduced to be smaller than that of the existing OFDM and a filter corresponding to a length amounting to the reduced length is applied by subband unit, whereby OOBE is lowered. Since a length of the filter maintains smaller than a length of CP, OOBE is obtained and N-point FFT is also enabled at a receiving end, whereby receiver complexity is not caused. Yet, compared to the existing two kinds of schemes, a slope in a transition interval of OOBE is weakened disadvantageously.

The present invention relates to a wireless communication system based on a filtered CP-OFDM technique that is a new waveform for the future communication. Particularly, proposed is a technique for a scheme of adaptively applying filters of a resource block (RB) unit in downlink based on a filter book.

Figure 2:
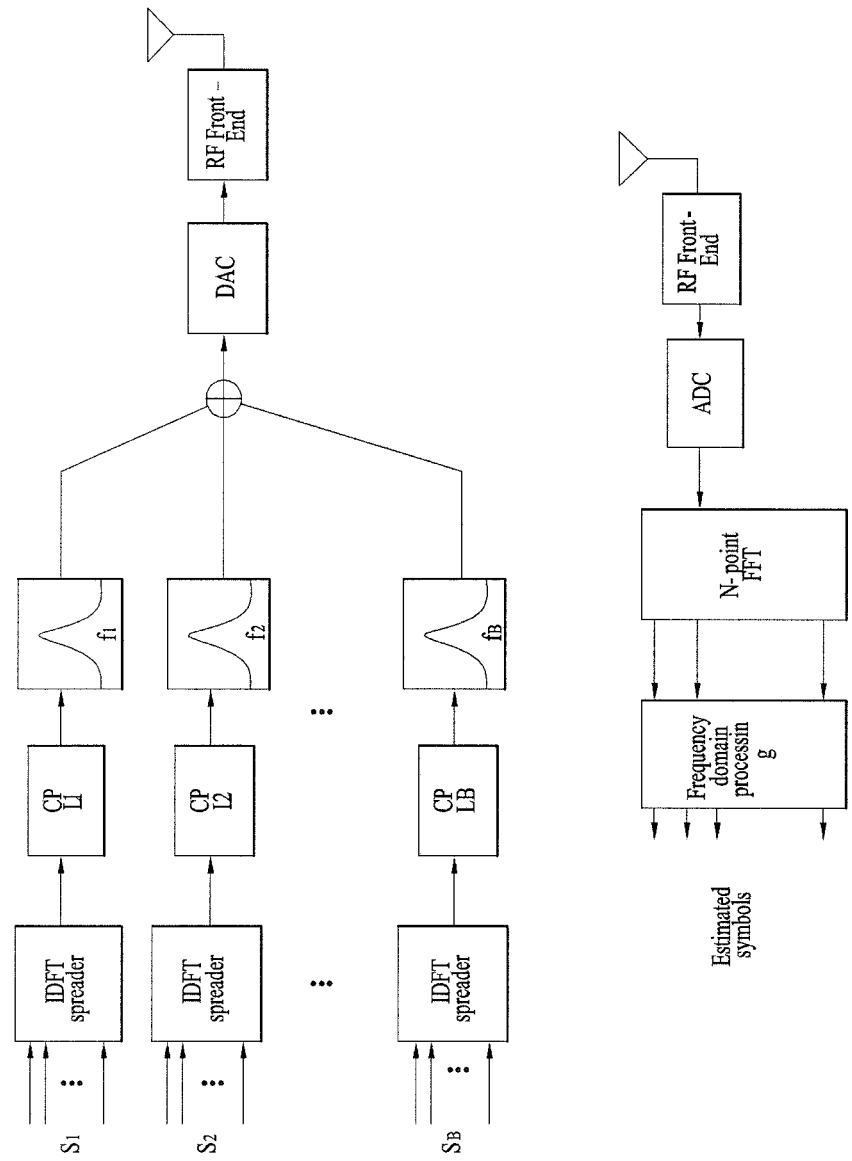
FIG. 2 is a diagram showing a transmitting/receiving end of an apparatus that uses FCP-OFDM scheme of applying a filter by a bundle unit of subcarriers.

FIG. 2 is a diagram showing a transmitting/receiving end of an apparatus that uses FCP-OFDM scheme of applying a filter by a bundle unit of subcarriers.

Unlike the existing OFDM, as shown in FIG. 2, there is a difference in that a filter is applied by a bundle unit of several subcarriers in a transmitter. Thus, by applying a filter by a sub-band unit, it is able to considerably reduce influence of a signal affecting another adjacent band in comparison with the existing OFDM scheme. The application of the filter by the subband unit has a great gain in aspect of utilization of a fragmented spectrum in a current frequency resource exhausted situation and serves as a foundation for the future communication technology.

Figure 3:
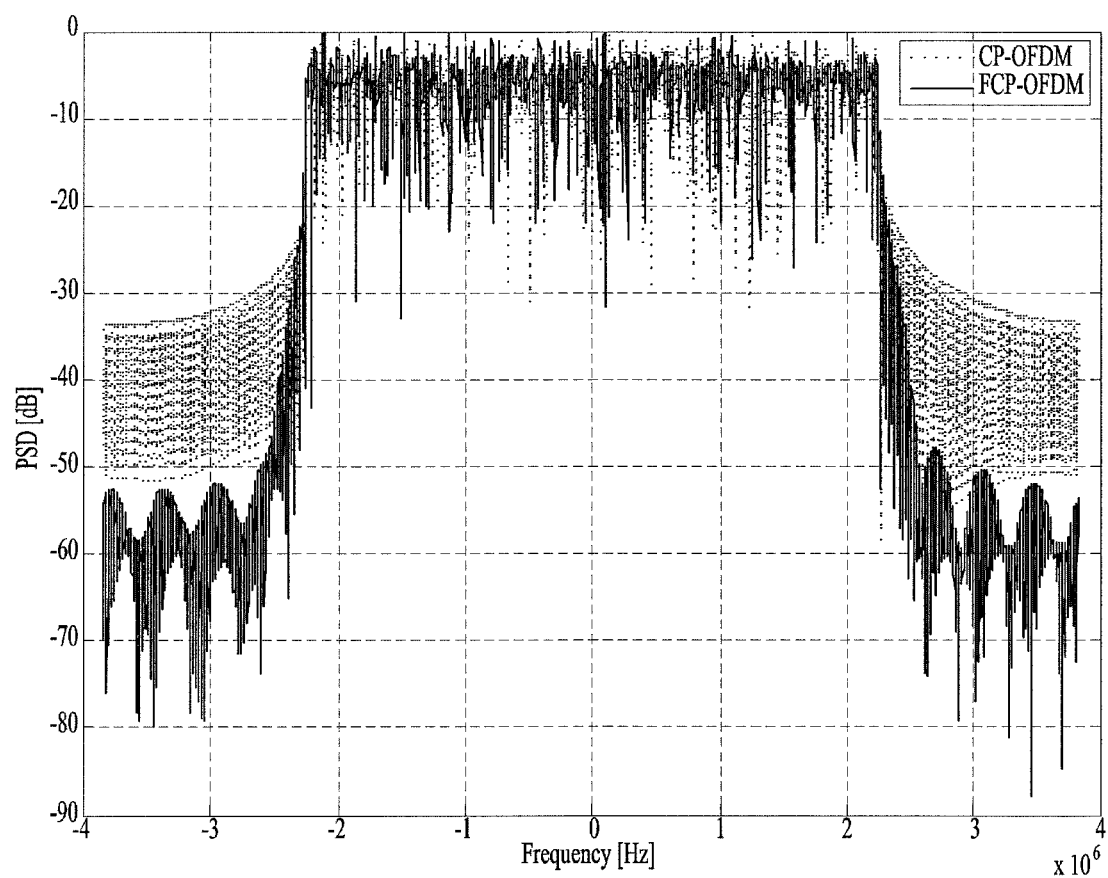
FIG. 3 is a diagram of an example of comparing power spectrums of FCP-OFDM and OFDM.

FIG. 3 is a diagram of an example of comparing power spectrums of FCP-OFDM and OFDM.

Referring to FIG. 3, it can be observed that power of a signal affecting another band of the existing OFDM is lowered slowly. In case of UF-OFDM, it can be observed that the power is lowered fast. Based on such characteristics, it is regarded as one candidate of a new waveform.

Figure 4:
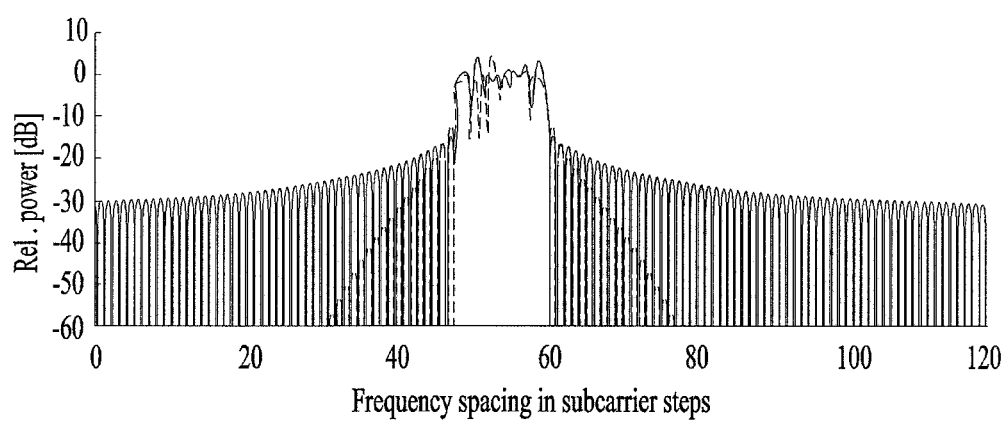
FIG. 4 is a diagram showing a power spectrum in aspect of subband.

FIG. 4 is a diagram showing a power spectrum in aspect of subband.

Referring to FIG. 4, a filter is applied by subband unit instead of applying a filter to a full band.

Sharpness of an out-of-band emission (OOBE) signal brings many advantages in an asynchronous situation. So to speak, if orthogonality of two signals is guaranteed in a frequency domain, the necessity for synchronization in a time domain disappears. On the contrary, in case of OFDM having poor characteristics of out-of-band emission, when synchronization is twisted, degradation of performance appears seriously. Moreover, when frequency offset is generated, it is advantageous in that influence on an adjacent band can be remarkably reduced.

Therefore, new waveforms capable of guaranteeing orthogonality in a frequency domain appear as solutions instead of the existing OFDM. FCP-OFDM can promote a reception performance gain in an asynchronous situation through adjustment of an out-of-band emission pattern in a frequency domain.

The FCP-OFDM system can receives data of its own using N-point FFT while maintaining orthogonality irrespective of a filter applied for each UE (user) data when frequency synchronization is matched in downlink. When there are UE (user) data of K users in the FCP-OFCM system shown in FIG. 2, a signal of a receiving end of an $i^{th}$ user can be written as follows.

$$y = h_i * \sum_{n=1}^{K} \left( \sum_{k=1}^{K_n} f_{n,k} * x_{n,k} \right) + n \qquad \text{[Formula 1]}$$

Here, $h_i$ means a channel in size of ($L_{ch} \times 1$) from a base station to an $i^{th}$ UE (user), $f_{n,k}$ indicates a filter ($L_f \times 1$) for a $k^{th}$ subband of an $n^{th}$ UE, and $x_{n,k}$ means a signal (($L_{cp} + N_{fft}) \times 1$) having a CP (cyclic prefix) added thereto after a $k^{th}$ band signal of an $n^{th}$ UE has passed through IDFT (or IFFT). And, n means AWGN of a length (($L_{ch}+L f+L_{cp}+N_{fft}-2) \times 1$). Moreover, assume $L_{ch}+L_f-2 \leq L_{cp}$.

Hence, by applying N-point FFT by starting with an $(L_{ch}+L_f-1)^{th}$ sample at a receiving end, a signal Y in the frequency domain can be expressed as Formula 2.

$$Y = H_i \cdot \sum_{n=1}^{K} \left( \sum_{k=1}^{K_n} F_{n,k} \cdot X_{n,k} \right) + N = \qquad \text{[Formula 2]}$$

-continued
$$H_i \cdot \left( \sum_{k=1}^{K_i} F_{i,k} \cdot X_{i,k} \right) + H_i \cdot \sum_{n=1, n \neq i}^{K} \left( \sum_{k=1}^{K_n} F_{n,k} \cdot X_{n,k} \right) + N$$

On a right side of the equation of Formula 2, a first term means a signal of its own and a second term indicates a signal sent to another UE. Here, $H_i$ is a value of a size ($N_{fft} \times 1$) of a channel frequency region of applying N-point FFT to $h_i$, $F_{n,k}$ is a value of a size ($N_{fft} \times 1$) of a frequency region of $f_{n,k}$, and $X_{n,k}$ means data of a size ($N_{fft} \times 1$) of a $k^{th}$ subband of an $n^{th}$ UE. And, '·' indicates an element-wise vector product.

Figure 5:
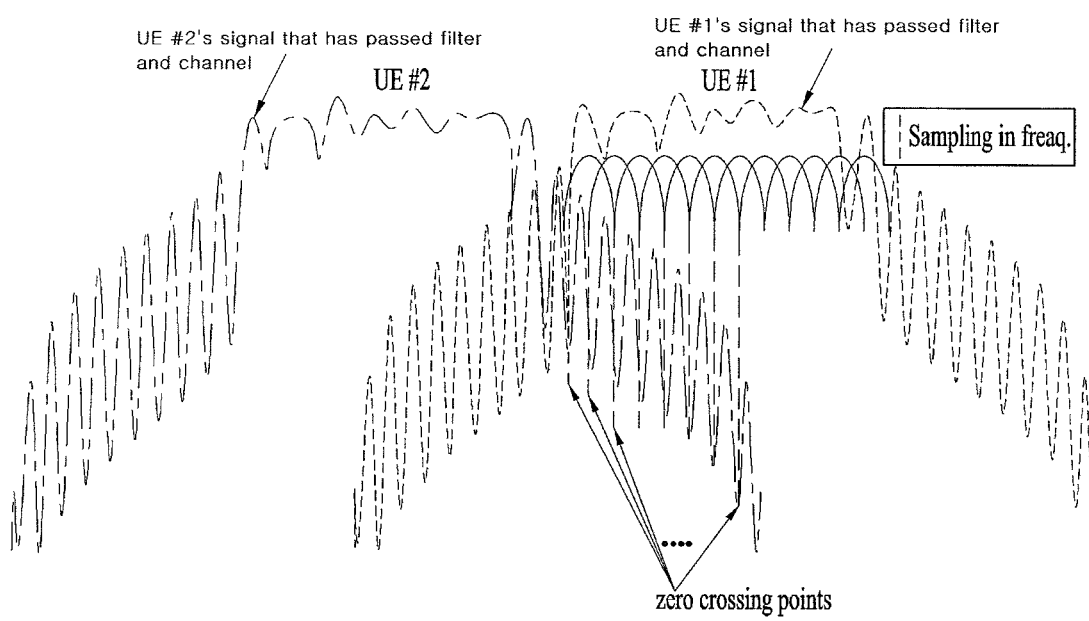
FIG. 5 is a diagram showing orthogonality in sampling in a frequency domain in case of reception when two user equipments (UE #1, UE #2) are assigned.

FIG. 5 is a diagram showing orthogonality in sampling in a frequency domain in case of reception when two user equipments (UE #1, UE #2) are assigned.

In case of data of each UE (user equipment), since frequency of FDMA type is assigned each, by windowing a frequency region assigned to a UE from Formula 2, the UE can receive a signal without interference with a signal of another UE. Yet, the case of FIG. 5 means an idealistic situation when frequency synchronization is exactly matched. In a communication situation, carrier frequency offset (CFO) is inevitably generated due to mismatch of location oscillators (LO) or Doppler effect between a base station and a UE. To compensate for such CFO, a method of estimating CFO, compensating in a time domain, and then taking FFT is generally used. Despite that CFO is estimated and compensated for, it is apparent that residual CFO remains due to estimation error. Hence, a received signal of an $i^{th}$ UE in a residual CFO remaining environment can be expressed as Formula 3.

$$y = c_i \cdot \left( h_i * \sum_{n=1}^{K} \left( \sum_{k=1}^{K_n} f_{n,k} * x_{n,k} \right) \right) + n \qquad \text{[Formula 3]}$$

Unlike the existing CFO-absent formula, a new term $c_i$ due to a residual CFO is multiplied by an element-wise vector product, where $c_i$ is represented as Formula 4.

$$c_i = e^{j2\pi \epsilon_i m/N_{fft}} m=1, \ldots, L_{ch}+L_f+L_{CP}+N_{fft}-2 \qquad \text{[Formula 4]}$$

Here, $\epsilon_i$ indicates a residual CFP of an $i^{th}$ UE.

Hence, after the CP removal, by applying N-point FFT, a received signal of a final frequency region is represented as Formula 5.

$$Y = C_i \times H_i \cdot \left( \sum_{k=1}^{K_i} F_{i,k} \cdot X_{i,k} \right) + \qquad \text{[Formula 5]}$$
$$C_i \times H_i \cdot \sum_{n=1, n \neq i}^{K} \left( \sum_{k=1}^{K_n} F_{n,k} \cdot X_{n,k} \right) + N$$

Here, $C_i$ is a matrix in size ($N_{fft} \times N_{fft}$) corresponding to a residual CFO, × means a matrix product, and an element of an $n^{th}$ column in an $m^{th}$ row is defined as Formula 6.

$$[C_i]_{m,n} = \frac{\sin\left(\frac{\pi}{N_{fft}}(\epsilon_i - (m-n))(N_{fft})\right)}{\sin\left(\frac{\pi}{N_{fft}}(\epsilon_i - (m-n))\right)} e^{j2\pi(\epsilon_i-(m-n))(N_{fft}-1)} \qquad \text{[Formula 6]}$$

Hence, since orthogonality disappears when its data is decoded, interference is generated.

Figure 6:
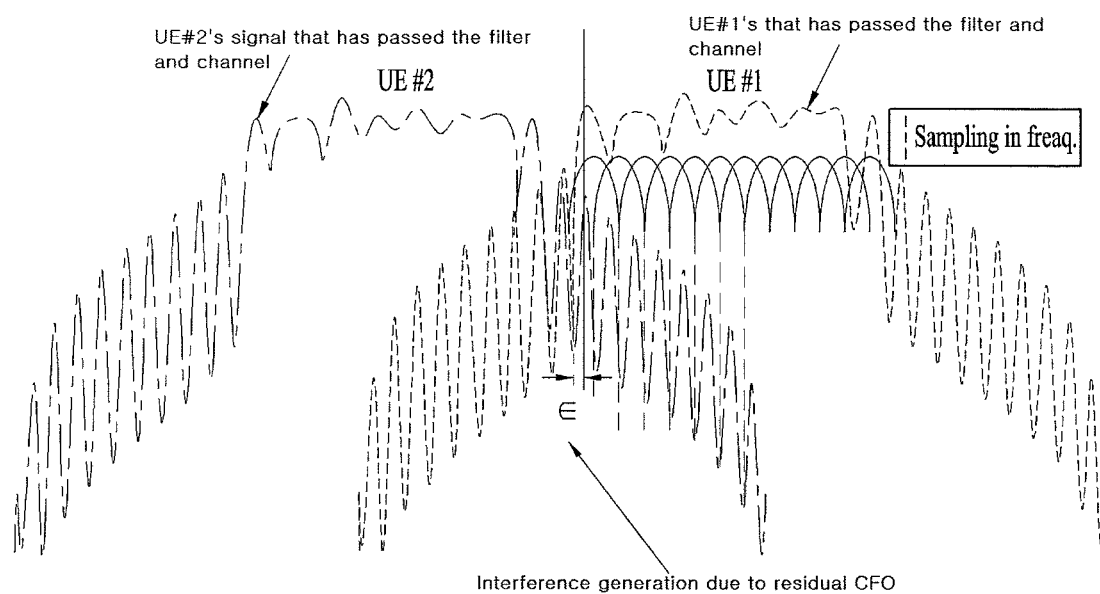
FIG. 6 is a diagram showing an interfering part in a frequency domain when residual CFO remains.

FIG. 6 is a diagram showing an interfering part in a frequency domain when residual CFO remains.

Referring to FIG. 6, in case of a reception by UE #1, when frequency sampling is performed in a frequency domain, interference is generated due to residual CFO.

As a result, an SINR (signal-to-interference-plus-noise ratio) of a $k^{th}$ subcarrier of an $i^{th}$ UE can be defined as Formula 7.

$$SINR_{i,k} = \frac{[C_i]_{k,k} |[H_i]_k [F_{i,k}]_k|^2 \; P_{i,k}}{\sum_{j=1}^{K}\sum_{m=1}^{K_j}[C_i]_{j,m}|[H_j]_k[F_{j,m}]_k|^2 \; P_{j,m} - [C_i]_{k,k}|[H_i]_k[F_{i,k}]_k|^2 \; P_{i,k} + \sigma_{i,k}}$$ [Formula 7]

In Formula 7, $P_{i,k}=E[[X_{i,k}]_k]$ indicates a power of a $k^{th}$ subcarrier of an $i^{th}$ UE. As shown in Formula 7, it can be observed that a received SINR is actually determined depending on a coefficient value of a filter as well as a channel. Hence, by appropriately adjusting a filter according to a channel, total throughput can be improved as well as reception performance of UE.

The present invention intends to propose a filter book selection and feedback method for improving inter-UE reception performance of a downlink FCP-OFDM system. A base station can inform a UE of a feedback reporting mode, which is provided for feeding back information on a filter selected from a filter book, by upper layer signaling. And, the base station can instruct the UE to report the feedback information by RB unit or subband unit through upper layer signaling or physical layer signaling.

Embodiment 1

A UE may transmit feedback information per RB for allocated RBs to a base station. The UE may select a filter, which enables an average SINR to become a maximum on the corresponding RB, from a predefined filter book. For example, a UE may select each filter, which enables an average SINR to become a maximum within a corresponding RB, using a scheme of calculating SINR in Formula 7. For example, a filter book configured with N filters is shown in FIG. 7. In the predefined filter book shown in FIG. 7, filter coefficients (f1, f2 . . . fN) corresponding per filter index exist. A UE may select information (e.g., a selected filter index) regarding a filter selected from the filter book and then feed back the selected information to the base station. And, the UE may feed back the selected filter index and information (e.g., FQI (filter quality information) value) on a filter quality corresponding to the selected filter index to the base station. In the predefined filter book, a filter of a unique shape per filter exists. And, information on such a filter may be shared by the base station and the UE.

As observed from Formula 7, a desired signal of a UE in a received SINR is proportional to a square of a channel response size undergone by a corresponding subcarrier and a used filter response size. On the other hand, interference comes from data assigned to another UE and is proportional to a square of a channel response of a corresponding subcarrier and a size of a filter response. Thus, a received SINR of each UE varies according to a filter assigned to multiple UEs, whereby in order for a base station to control data throughput of a UE, the base station needs to be informed of information on reception performance according to a use of a corresponding filter as well as the existing channel information feedback.

In order for a UE to calculate SINR of its own, 4 kinds of informations are required as follow.

(1) channel information to which a filter is not applied (2) Residual CFO (3) number of RBs actually allocated to the UE and number of RBs allocated to another UE (4) Frequency response (filter coefficient) of filter applied for the UE and another UE First of all, in order for a UE to estimate its reception performance, the UE requires channel information before applying a corresponding filter. Hence, the corresponding information may be obtained not through a UE-specific reference signal but through a common reference signal. For example, in case of an LTE system, the UE may estimate the corresponding channel information at a receiving end through CRS.

Moreover, in case of residual CFO, it is able to estimate an average value amounting to a value remaining after compensation using a symbol for periodically compensating for CFO. For example, it can be obtained through PSS (primary synchronization signal) or SSS (secondary synchronization signal).

Regarding information required for finding out a received SINR, it is able to calculate the corresponding received SINR only if the number of RBs of actually allocated UEs and filters applied thereto are obtained. Yet, it is almost impossible for a single UE to obtain such information all. Hence, by limiting the number of filters applicable through the filter book and assuming that other UEs are assigned to all other RBs, it is able to estimate an averaged received SINR.

As shown in FIG. 7, the filter book may predetermine a set of filters through system simulation by trade-off between OOBE and inter-symbol-interference.

First of all, based on the above filter book, a UE may calculate a received signal of a corresponding subcarrier based on a single filter and may calculate interference (intra-user-interference) caused by an inside of its block. Secondly, assuming that interference (inter-user-interference) between different UEs is identically applied to each of N, it is able to calculate an amount of an interference signal. By taking an average of all the above-obtained cases, it is able to find an expected received SINR for a single filter. Moreover, an average value is taken for all subcarriers belonging to RB.

By performing such a method for N filters, a UE may select a filter index capable of obtaining a maximum SINR in aspect of the UE and then fed back an SINR value corresponding to the selected filter index to the base station.

Based on the feedback information received from the UE, the base station may perform scheduling and optimize system throughput in consideration of O OBE through the scheduling.

Embodiment 2

A UE may transmit feedback information per subband (including at least 2 RBs) for allocated subbands to a base station. The UE may select a filter, which enables an average SINR to become a maximum on a corresponding subband, from a predefined filter book. For example, the UE may select each filter for enabling an average SINR to become a maximum within a corresponding subband using the scheme of calculating SINR in Formula 7. And, the UE may freed back a selected filter index and a value (i.e., FQI (filter quality information)) corresponding to the selected filter index to the base station.

Embodiment 1 relates to a method of reporting filter information, which maximizes FQI per individual RB, to a base station. According to this method, many degrees of selection freedom are provided to the base station by providing lots of information in aspect of system optimization. Yet, a considerable feedback amount and lots of calculation complexity according to the number of filters are required. Therefore, a method of reducing the corresponding feedback amount and the corresponding calculation complexity is proposed.

A base station can reduce a feedback amount and calculation complexity by adjusting a unit for calculating FQI and a filter index. For example, feedback is configured to be performed by a bundle unit of RBs instead of each RB unit. Thus, a UE may calculate an expected received SINR by applying a same filter by an assigned subband unit of its own and assuming interference for the same UE (a same filter) by subband unit.

Embodiment 3

A base station may inform a UE of an RB size (e.g., subband unit or full band) for which feedback information is required. And, the UE may select a filter capable of maximizing an average SINR value for only RB of a designated size and then feed back the selected filter index and a corresponding FQI value.

Embodiment 1 or 2 relates to a method of reporting filter information, which maximizes FQI for every individual RB or FQI per subband, to a base station. According to this method, lots of information is provided in aspect of system optimization, whereby lots of selection degrees of freedom can be provided to the base station. Yet, a considerable feedback amount and lots of calculation complexity according to the number of filters are required. Therefore, a method of reducing the corresponding feedback amount and the corresponding calculation complexity is proposed. Unlike the aforementioned Embodiment 1 or 2, as a base station configures specific RBs, for which feedback information is required, for a UE, the UE can calculate whether a maximum received SINR is obtained when a prescribed filter is applied to an allocated corresponding resource. In doing so, interference coming due to another UE filter can be calculated in the same manner of Embodiment 1 by taking an average value after applying all filters to all other bands.

Through this, the UE can obtain a feedback amount and calculation complexity reduced in comparison with Embodiment 1. Information the base station should deliver to the UE is the information indicating a feedback information required resource. The UE can be informed of such information through physical layer signaling or upper layer signaling. For example, the base station determines a bundle of 4 RBs and may inform the UE of a corresponding resource index. And, the UE may calculate an expected received SINR on the indicated resource based on the indicated corresponding resource index information. When interference is estimated, a filter may be applied by each RB unit. Or, interference can be estimated by assuming that filters are identically applied by a corresponding bundle unit (e.g., an indicated 4RBs unit).

Embodiment 4

A UE may transmit feedback information per RB for allocated RBs to a base station. The UE may select a filter, which enables an average SINR to become a maximum on a corresponding RB, from a predefined filter book. And, the UE may feedback a selected filter index and information (e.g., FQI (filter quality information) value) on a filter quality corresponding to the selected filter index to the base station.

Embodiments 1 to 3 propose methods for a UE to report FQI and filter index information by estimating a received SINR. According to the corresponding technique, overhead for estimating an interference amount per filter by RB or subband unit is generated in order to estimate interference if the number of filers increases. Therefore, a signal-to-leakage-and-noise ratio (SLNR) is calculated instead of an expected received SINR of the UE, the calculated SLNR is calculated into FQI, and the FQI can be then reported to a base station.

SLNR is defined as Formula 8.

$$SLNR_{i,k} = \frac{[C_i]_{k,k} \, | \, [H_i]_k [F_{i,k}]_k \, |^2 \; P_{i,k}}{| \, [H_i]_k [F_{i,k}]_k \, |^2 \; P_{i,k} \Sigma_{j=1}^{K} \Sigma_{m=1}^{K_j} [C_i]_{j,m} - [C_i]_{k,k} \, | \, [H_i]_k [F_{i,k}]_k \, |^2 \; P_{i,k} + \sigma_{i,k}} \quad \text{[Formula 8]}$$

As shown in Formula 8, unlike the SINR formula, interference going out as leakage according to its filter application is applied to the denominator terms. Hence, when the corresponding formula is calculated, total N filters are applied and an average value amounting to the number of the allocated subcarriers can be then taken. This brings lots of complexity improvements.

Through the corresponding method, all the existing per-RB/subband or designated resource schemes are applicable.

Moreover, the feedback techniques of FDD type are proposed so far. Yet, in case of TDD, a base station can be aware of channel information through a reference signal such as SRS using channel reciprocity and filter optimization is possible in the same manner.

Moreover, the corresponding technique is applicable to a block-wise filtered OFDM scheme as well as to FCP-OFDM.

The above-mentioned embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

A method for a UE to transmit feedback information in a wireless communication system is industrially applicable to various kinds of wireless communication systems such as 3GPP LTE/LTE-A system, etc.

What is claimed is:

1. A method for transmitting feedback information by a user equipment in a wireless communication system, the method comprising:
   obtaining information on a predefined filter book;
   receiving, from a base station, information on a plurality of subbands, wherein the plurality of subbands are configured to be applied respectively with a plurality of filter indexes;
   estimating a channel for each of the plurality of subbands;
   obtaining the plurality of filter indexes corresponding respectively to the plurality of subbands, wherein each of the plurality of filter indexes is selected from the predefined filter book for maximizing a signal to leakage-and-noise ratio (SLNR) of a corresponding subband among the plurality of subbands, wherein each of the plurality of subbands includes at least one resource block (RB), and each of the at least one RB includes a plurality of subcarriers; and
   transmitting, to the base station, the feedback information including the plurality of filter indexes and a plurality of filter quality information (FQI) values corresponding respectively to the plurality of filter indexes,
   wherein the SLNR is calculated based on following equation, $$SLNR_{i,k} = \frac{[C_i]_{k,k}|[H_i]_k[F_{i,k}]_k|^2 P_{i,k}}{|[H_i]_k[F_{i,k}]_k|^2 P_{i,k} \sum_{j=1}^{K} \sum_{m=1}^{K_i} [C_i]_{j,m} - [C_i]_{k,k}|[H_i]_k[F_{i,k}]_k|^2 P_{i,k} + \sigma_{i,k}},$$

and
wherein a residual carrier frequency offset, CFO, $[C_i]_{m,n}$ is calculated based on following equation, $$[C_i]_{m,n} = \frac{\sin\left(\frac{\pi}{N_{\textit{fft}}}(\epsilon_i - (m-n))(N_{\textit{fft}})\right)}{\sin\left(\frac{\pi}{N_{\textit{fft}}}(\epsilon_i - (m-n))\right)} e^{j2\pi(\epsilon_i - (m-n))(N_{\textit{fft}}-1)},$$

where $[C_i]$ is a M×N matrix,
$[C_i]_{m,n}$ is an element of an n-th column in an m-th row in $[Ci]$,
$SLNR_{i,k}$ is an SLNR of the k-th subcarrier of the i-th user equipment,
$P_{i,k}$ is a power of the k-th subcarrier of the i-th user equipment,
$F_{i,k}$ is a filter of the K-th subcarrier of the i-th user equipment, and
$[H_i]_k$ is a channel of the k-th subcarrier of the i-th user equipment.

2. The method of claim 1, wherein the wireless communication system comprises a Filtered Cyclic Prefix-Orthogonal Frequency Division Multiplexing (FCP-OFDM) system.

3. The method of claim 1, wherein each of the plurality of filter indexes corresponds to a filter enabling the SLNR to become a maximum for a downlink signal to which a Filtered Cyclic Prefix-Orthogonal Frequency Division Multiplexing (FCP-OFDM) scheme is applied.

4. The method of claim 1, wherein the plurality of subbands includes all RBs allocated to the user equipment.

5. The method of claim 1, wherein the plurality of subbands among subbands allocated to the user equipment are instructed by the base station in order for the UE to report, to the base station, feedback.

6. A user equipment for transmitting feedback information in a wireless communication system, comprising:
   a transceiver coupled to a processor; and
   the processor configured to:
   obtain the plurality of filter indexes corresponding respectively to the plurality of subbands, wherein each of the plurality of filter indexes is selected from the predefined codebook for maximizing a signal to leakage-and-noise ratio (SLNR) of a corresponding subband among the plurality of subbands, wherein each of the plurality of subbands includes at least one resource block (RB), and each of the at least one RB includes a plurality of subcarriers; and
   transmit, to a base station, the feedback information including the plurality of filter indexes and a plurality of filter quality information (FQI) values corresponding respectively to the plurality of filter indexes,
   wherein the SLNR is calculated based on following equation, $$SLNR_{i,k} = \frac{[C_i]_{k,k}|[H_i]_k[F_{i,k}]_k|^2 P_{i,k}}{|[H_i]_k[F_{i,k}]_k|^2 P_{i,k} \sum_{j=1}^{K} \sum_{m=1}^{K_i} [C_i]_{j,m} - [C_i]_{k,k}|[H_i]_k[F_{i,k}]_k|^2 P_{i,k} + \sigma_{i,k}},$$

and
wherein a residual carrier frequency offset, CFO, $[C_i]_{m,n}$ is calculated based on following equation, $$[C_i]_{m,n} = \frac{\sin\left(\frac{\pi}{N_{\textit{fft}}}(\epsilon_i - (m-n))(N_{\textit{fft}})\right)}{\sin\left(\frac{\pi}{N_{\textit{fft}}}(\epsilon_i - (m-n))\right)} e^{j2\pi(\epsilon_i - (m-n))(N_{\textit{fft}}-1)},$$

where $[C_i]$ is a M×N matrix,
$[C_i]_{m,n}$ is an element of an n-th column in an m-th row in $[C_i]$,
$SLNR_{i,k}$ is an SLNR of the k-th subcarrier of the i-th user equipment,
$P_{i,k}$ is a power of the k-th subcarrier of the i-th user equipment,
$F_{i,k}$ the k-th subcarrier of the i-th user equipment, and
$[H_i]_k$ a channel of the k-th subcarrier of the i-th user equipment.

7. The user equipment of claim 6, wherein the wireless communication system comprises a Filtered Cyclic Prefix-Orthogonal Frequency Division Multiplexing (FCP-OFDM) system.

8. The user equipment of claim 6, wherein each of the plurality of filter indexes corresponds to a filter enabling the SLNR to become a maximum for a downlink signal to which a Filtered Cyclic Prefix-Orthogonal Frequency Division Multiplexing (FCP-OFDM) scheme is applied.

9. The user equipment of claim 6, wherein the plurality of subbands includes all RBs allocated to the user equipment.

10. The user equipment of claim 6, wherein the plurality of subbands among subbands allocated to the user equipment are instructed by the base station, in order for the UE to report, to the base station, feedback.

\* \* \* \* \*